May 18, 1937.    W. REINDERS    2,081,097
MANUFACTURE OF HYDROGEN PEROXIDE
Filed April 15, 1936    2 Sheets-Sheet 1
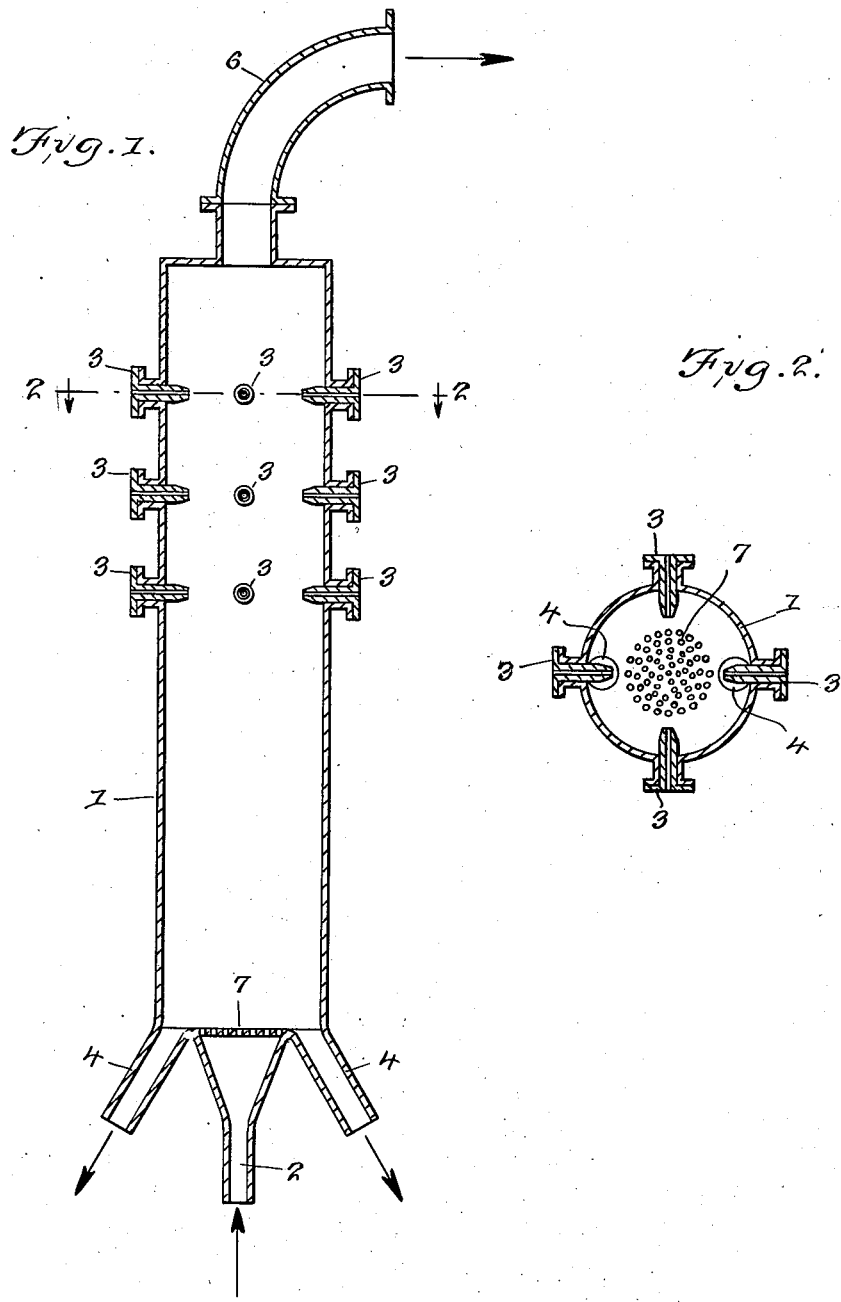

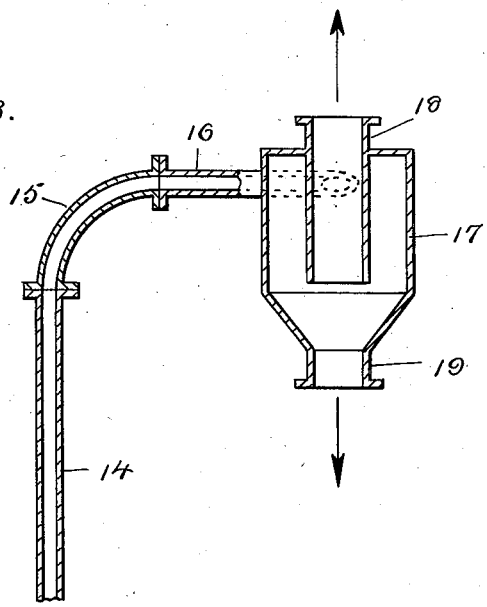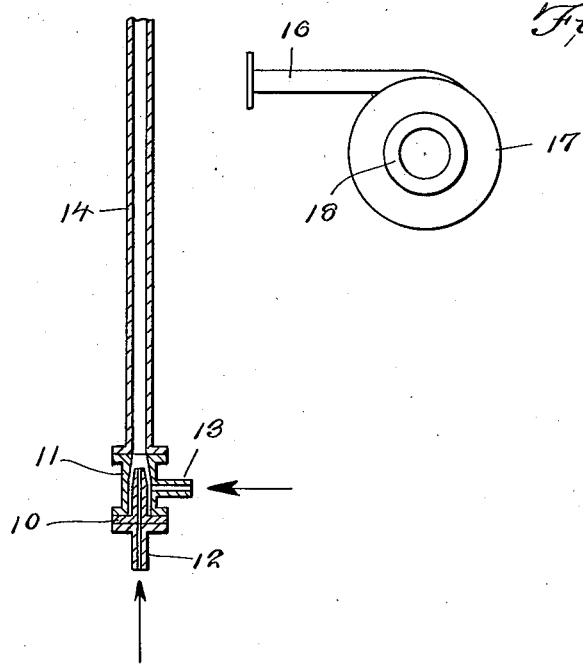

Patented May 18, 1937

2,081,097

UNITED STATES PATENT OFFICE 2,081,097

MANUFACTURE OF HYDROGEN PEROXIDE

Willem Reinders, Delft, Netherlands, assignor to Naamlooze Vennootschap Industrieele Maatschappij Voorheen Noury & Van Der Lande, Deventer, Netherlands, a company of Netherlands Application April 15, 1936, Serial No. 74,566
In the Netherlands April 12, 1935

6 Claims. (Cl. 202—52)

Various processes are known for the preparation of hydrogen peroxide from solutions, in which processes this compound is formed by heating, for example, solutions of persulphates, persulphuric acid, etc.

There is, for example, a well-known process, according to which one single distillation is applied by conducting an acid persulphate solution in vacuo through heated tubes, in which steam may or may not be introduced.

It has also been proposed to spray the solution in an evacuated, externally or internally heated vessel, with the aid of superheated aqueous vapor.

In all these processes known heretofore, the persulphate or persulphuric acid solution that is brought to increased concentration and to hydrolysis, or to a splitting off of $H_2O_2$, is in contact with or touches with a heated surface, ordinarily a lead surface, which entails a loss of active oxygen owing to catalytic action.

Further, all these well-known processes have this common feature, that for effecting the hydrolysis and for the evaporation of the water and the hydrogen peroxide, heating agents are used and, as a rule, steam is employed as a heating agent but with a temperature which is rather low and in any case below 300° C. According to the present invention it now appears that by the application of heating agents with a much higher temperature, that may lie considerably above 300° C., both the rapidity of the hydrolysis and the rapidity of the elimination of the hydrogen peroxide from the reaction mixture may be greatly increased.

It appeared, for example, to become possible to form hydrogen peroxide with a good yield by the action of superheated steam of 500–525° C., on a sulphuric acid ammonium persulphate solution, with the hydrogen peroxide escaping immediately in vapor form from the reaction mixture and condensable in the usual way under decreased pressure.

The surprising fact is, that by the use of this very high steam temperature no rise is given to larger losses of active oxygen, although both persulphates and persulphuric acid, Caro-acid and hydrogen peroxide decompose quickly at elevated temperatures.

This process is further connected with various advantages, among which are:

(1) The hydrolysis takes place so quickly that a small reaction chamber or zone is sufficient.

(2) The heat that is required for the reaction may be supplied with a relatively small quantity of steam or other gaseous heating agent, so that accordingly the hydrogen peroxide may immediately be obtained in concentrated form.

In lieu of superheated steam of 300–600° C., one may also use an indifferent gas, such as, for example, air, oxygen, nitrogen, heated to a temperature lying between these limits, or one may use a mixture of superheated steam and an indifferent gas, or vapor, having the said temperature. For example, a mixture of steam and one of the named gases may be employed at the temperatures indicated.

The process is preferably carried out in a quartz-apparatus.

Although heating agents with a temperature lying between 300 and 600° C. may be applied, preferably use is made of temperatures above 450° C. In making use of these higher temperatures more heat can be supplied with the same quantity of gas or vapor.

The size of the reaction chamber or of the tubes in which the reaction takes place and the speed of introduction of the liquid and the vapor or gas, and, moreover, the temperature of the latter, must be accommodated one to another.

In order to allow the hydrolysis to take place as quickly as possible, a certain quantity of heat must be supplied to the liquid. Since this heat is only delivered by the highly heated gas or vapor, the quantity and temperature of this must be such, that the required number of calories can be delivered.

Further, the diameter of the tube or tubes, or the size of the reaction chamber must be such that the liquid can be carried with the steam or gas against gravitational action, while the speed the steam or gas gives to the liquid must be chosen in such a way in connection with the length or size of the apparatus or reaction zone, that sufficient time for the reaction is given.

It falls within the province of the person skilled in the art to properly select the magnitude of the factors affecting the process of the present invention in designing or using apparatus for practicing the present invention or for attaining the desired capacity of apparatus used or to be used in practicing the invention.

It is necessary to carry out this reaction under decreased pressure. The pressure in the apparatus, measured at the spot where the gases and the liquid comes out, may vary between 1 and 10 cm. of mercury. Preferably the pressure is taken as low as possible.

Since the pressure in the apparatus is of influence on the time the reaction mixture remains in the tube or in the reaction chamber, this factor must also be taken into consideration with the factors referred to above that are determinant for the success of the hydrogen peroxide production.

When the reaction mixture leaves the apparatus or reaction zone, the vapor is separated from the distillation residue. This may take place by well-known means, as by the use of shock-surfaces, cyclones, or cyclone separators, Raschig rings and the like.

It is also possible to preheat the liquid, prior to its entering into the apparatus, to a temperature of 50–100° C. preferably at 85–95° C. In this case less heat need be supplied to the apparatus and accordingly either the quantity, or the temperature, of the heating agent may be chosen at a lower value.

As regards the composition of the solutions, from which the hydrogen peroxide is obtained, it appears that this may be varied within wide limits.

Thus the ammonium persulphate concentration may lie between 100–250 gr. per liter, the sulphuric acid contents between 200–900 gr. per liter, the ammonium sulphate concentration between 0–400 gr. per liter.

In using persulphuric acid solutions, the $H_2S_2O_8$ concentration may lie between 100 and 300 gr. per liter, while the sulphuric acid concentration can be 150–250 gr. $H_2SO_4$ per liter.

Although the solutions of the above mentioned composition give the best results, the process according to the invention may also be carried out with solutions having a composition that lies outside these limits. It is also to be understood that the present invention is not limited in its application to producing hydrogen peroxide from the specific percompounds named herein as starting materials. All substances yielding hydrogen peroxide by hydrolysis, or hydrolytic action, under the conditions under which the process is practiced may be used as starting materials in lieu of the specific compounds mentioned. Thus all aqueous solutions of substances which will yield hydrogen peroxide by treatment according to the present invention may be used as starting materials for obtaining hydrogen peroxide according to the invention. In the appended claims the term "persulphate" includes persulphuric acid and Caro's acid (monopersulphuric acid) as well as salts of persulphuric acids.

The residue of the liquid that remains after the hydrogen peroxide has been separated or distilled off, may again be electrolyzed after it has been diluted with water to the desired concentration and from the persulphate or persulphuric acid solution formed thereby, hydrogen peroxide may again be obtained according to the process.

A special method of carrying out the invention consists in that the highly heated gas or vapor equally serves to introduce the liquid into the apparatus and to atomize the liquid. By a suitable choice of the quantity and of the temperature of the gas or vapor, all heat may be supplied in this way and a heat-exchange through the walls of the apparatus can thereby be rendered superfluous. These walls may then be manufactured from such a material that does not have a catalytically decomposing action on the active oxygen containing compounds, owing to which the yield of the installation is enhanced.

Apparatus suitable for practicing the process of the present invention is illustrated in the accompanying drawings. In these drawings Figure 1 illustrates a longitudinal section of one form of apparatus;

Figure 2 is a cross section on the line 2—2 in Figure 1, looking in the direction of the arrows applied to said line;

Figure 3 illustrates a longitudinal section of another form of apparatus suitable for use in practicing the invention; and Figure 4 illustrates a plan view of the cyclone separator illustrated in section in Figure 3.

Referring to Figures 1 and 2, a quartz reaction chamber is indicated by the numeral 1. In said chamber a solution, for example an aqueous solution, of persulphuric acid, or of ammonium persulphate and sulphuric acid, is brought into the form of fine drops, or in the form of a mist, by the sprayers 3. The said drops or mist particles then react with the superheated steam that is introduced through steam inlet means 2 provided with the sieve plate 7. The hydrogen peroxide containing vapors pass out of the apparatus through the bend 6 and are then conducted to any suitable condensing, or cooling, or fractionating means. The liquid residue, which is practically free of active oxygen, is delivered from the apparatus through outlet means 4. After the liquid residue has been brought to the desired concentration, the said liquid residue may be again utilized for forming percompound by electrolysis. The apparatus is operated under vacuum or reduced pressure, as described above. If necessary, the hydrogen peroxide containing vapors after passing through the bend 6 are conducted through a separator of the type 17 (see Figs. 3 and 4) before being fractionated in order to free them wholly from sulphuric acid and/or ammonium sulphate. The liquid residue in this separator 17 is combined with the one delivered from outlet means 4 and after having been brought to the desired concentration subjected to electrolysis for forming percompounds.

Referring to Figures 3 and 4, the numeral 10 indicates a sprayer or atomizer made of quartz. The sprayer or atomizer housing 11 may also be made of quartz. Superheated steam is introduced through steam inlet means 12, and this steam sprays or atomizes the persulphuric acid or persulphate solution introduced into the housing 11 through inlet means 13. The sprayed or atomized solution passes into the tube 14 which also may be made of quartz. The mixture of vapor and liquid passes through the bend 15 and pipe 16 to the separator 17. The vapors containing hydrogen peroxide leave the separator 17 through the outlet means 18 and may be conducted to any suitable cooling or condensing means or to a fractionating apparatus. The liquid residue separated in separator 17 is conducted therefrom through outlet means 19, and may be again electrolyzed as above described. This whole apparatus may be made of quartz. The apparatus is operated under vacuum or reduced pressure, as described above.

*Example I*

An aqueous solution containing per liter 116 grams of ammonium sulphate and 386 grams of sulphuric acid is conducted through a battery of 10 electrolyzers that are connected in series with a speed of 15 liters per hour. Each electrolyzer is operated at 100 amperes at a tension of 6 volts. The anodic current density amounts to 2 amperes per cm². The anodes are made of platinum, and the cathodes are made of graphite, wrapped with asbestos. The temperature of the electrolyte is not permitted to rise above 20° C., and to accomplish this purpose the electrolyte may be cooled in any suitable manner.

When the electrolyte flows from the last electrolyzer, it has the following composition: 200 gr. of ammonium persulphate and 300 gr. of sulphuric acid per liter.

This solution now enters into the quartz apparatus at 13 in Figure 3, with a speed of 15 liters per hour, and this apparatus is under a pressure of 3 cm. Tube 14 that is made of opaque quartz, has a length of 2500 mm. and an internal diameter of 20 mm.

At 12 the superheated steam of 525° C. enters into the apparatus with a speed of 35 kg. per hour.

The persulphate containing solution is concentrated, and hydrolyzed in tube 14, and the hydrogen peroxide enters into the vapor.

The whole reaction mixture passes into cyclone separator 17, in which five liters of the liquid residue separate out, while through 18 forty-five kg. of the hydrogen peroxide containing vapor pass to the condensing or fractionating means.

The liquid residue removed through 19 is, with the aid of water, brought again to the concentration of 116 gr. of ammonium sulphate and 386 gr. of sulphuric acid and again electrolyzed, after which a new cycle may be recommenced.

*Example II*

Figure 1 illustrates another apparatus suitable for use in practicing the invention. A solution of ammonium persulphate electrolytically prepared according to the way given in Example I, is conducted by the sprayers 3 to the reaction chamber 1, at a rate of 15 liters per hour, while superheated steam of 525° C. is introduced at 2 at a rate of 35 kg. per hour. The separation of the liquid residue from the mixture of water and hydrogen peroxide vapor, the fractional condensation of the latter mixture, the removal of the liquid residue, and the electrolysis of this latter, take place in the same way as described in Example I.

*Example III*

An electrolytically prepared solution, containing per liter: 200 grams of ammonium persulphate, 200 grams of ammonium sulphate and 180 grams of sulphuric acid, is atomized with steam superheated to 375° C. and of a pressure of 4 atmospheres, the said atomization taking place in a quartz tube and in the proportion of 1 liter of electrolyte to about 4 kg. of steam.

After they have left the quartz tube, the gaseous and liquid parts are separated from each other in an acid-proof vessel, after which the gaseous parts are condensed to hydrogen peroxide of the desired strength by a proper fractional condensation.

I claim:

1. Process for preparing hydrogen peroxide which comprises conducting steam of a temperature of 300° to 600° C. and an aqueuos solution of a percompound which hydrolytically decomposes to produce hydrogen peroxide into a chamber and in intimate contact with each other in said chamber, while a pressure not substantially exceeding ten centimeters of mercury is maintained in said chamber, and allowing the steam introduced into said chamber to act upon the solution introduced therein to produce hydrogen peroxide in vapor form and a liquid residue from the solution.

2. Process for preparing hydrogen peroxide which comprises conducting steam of a temperature of 300° to 600° C. and an aqueous solution of a persulphate which hydrolytically decomposes to produce hydrogen peroxide into a chamber and in intimate contact with each other in said chamber, while a pressure not substantially exceeding ten centimeters of mercury is maintained in said chamber, and allowing the steam introduced into said chamber to act upon the solution introduced therein to produce hydrogen peroxide in vapor form and a liquid residue from the solution.

3. Process for preparing hydrogen peroxide which comprises introducing into a reaction zone, in which a pressure not substantially exceeding ten centimeters of mercury is maintained, an aqueous solution, in finely divided condition, of a percompound which hydrolytically decomposes to produce hydrogen peroxide, and while introducing said solution into the said zone, conducting steam of a temperature of 300° to 600° C. into the said zone to form a mixture of steam and solution in said zone, allowing the steam in said mixture to act on the solution in the mixture to produce hydrogen peroxide in vapor form and a liquid residue from said solution, and separating hydrogen peroxide in vapor form from said liquid residue.

4. Process for preparing hydrogen peroxide according to claim 3 in which the aqueous solution of a percompound mentioned therein is an aqueous solution of a persulphate.

5. Process for preparing hydrogen peroxide which comprises conducting steam of a temperature of 300° to 600° C. and an aqueous solution of a percompound which hydrolytically decomposes to produce hydrogen peroxide into a chamber and in intimate contact with each other in said chamber, while a pressure not substantially exceeding ten centimeters of mercury is maintained in said chamber, and allowing the steam introduced into said chamber to act upon the solution introduced therein to produce hydrogen peroxide in vapor form and a liquid residue from the solution, the wall portions of said chamber being formed of a material which is catalytically inactive to decompose active oxygen containing compounds in said chamber.

6. Process for preparing hydrogen peroxide from an aqueous solution of a percompound which hydrolytically decomposes to produce hydrogen peroxide, which process comprises atomizing said solution with steam of a temperature of 300° to 600° C. into a reaction zone in which a pressure not exceeding ten centimeters of mercury is maintained, allowing the steam to act upon the said solution in the reaction zone to produce hydrogen peroxide in vapor form and a liquid residue from said solution, and separating hydrogen peroxide in vapor form from said liquid residue.

WILLEM REINDERS.